Patented June 16, 1942

2,286,391

UNITED STATES PATENT OFFICE 2,286,391

AZO DYE

Chiles E. Sparks, Wilmington, Del., assignor to E. I. du Pont de Nemours & Company, Wilmington, Del., a corporation of Delaware No Drawing. Application June 25, 1940, Serial No. 342,289

5 Claims. (Cl. 260—154)

This invention relates to new azo compounds having substantivity to cotton and regenerated cellulose fibers, to insoluble azo compounds which are produced from said substantive compounds, to fibers dyed with said compounds and to processes of making said compounds and dyeings. More particularly the first components of the substantive azo compounds consist of a type of di(amino-phenoxy-alkyl-acylamino) alkanes and the second components are a type of aryl amines. The substantive disazo compounds are especially useful as bases for developed dyeings, since they are capable of tetrazotization on the fiber and of development with suitable azo dye coupling components.

Various disazo compounds having substantivity for cotton and regenerated cellulose and which can be tetrazotized on the fiber and coupled with coupling components to form dyeings of excellent fastness and good insolubility are known; but in many cases the dyeings developed from such substantive tetrazotizable compounds do not have as good brightness as is desired.

It is among the objects of this invention to provide disazo dyes which are substantive to cotton and regenerated cellulose and which contain terminal primary aryl amino groups. Another object of the invention is to provide such substantive compounds which will give developed dyeings in improved brightness, improved washing fastness, good discharge properties and other properties desired in such dyeings, when they are tetrazotized on the fiber and coupled with suitable coupling components. Another object of the invention is to provide improved dyeings resulting from the tetrazotization and development of the described direct dyeings. Other objects of the invention will be apparent from the following description.

The objects of the invention are attained in general by tetrazotizing one of a class of di(amino-phenoxy-alkyl-acylamino) alkanes and coupling with a class of suitable arylamines, whereby a tetrazotizable azo compound substantive to cotton and regenerated cellulose is produced. This dye is dyed on the fiber, tetrazotized thereon and developed with a suitable dye coupling component which is devoid of solubilizing groups to form the finished dyeing. The substantive dyes are represented in general by the formula wherein D represents a radical of the groups consisting of the polymethylene diamines having 2 to 10 methylene groups and straight and branched chain alkyl derivatives thereof in which alkyl has 1 to 6 carbons and is substituted in the methylene groups once to twice the number of methylene groups, a radical of the diamino-cycloalkane series having 4 to 6 carbons in the ring and ring substituted straight and branched chain alkyl derivatives thereof in which alkyl has 1 to 6 carbons and is present once to two less than the number of carbons in the ring, and a radical of the diazacycloalkane series having 3 to 6 carbons in the ring and the straight and branched chain alkyl derivatives thereof in which alkyl has 1 to 6 carbons and is substituted in the ring carbons once to twice the number of carbons in the ring; [C(R)$_2$] represents the group consisting of straight and branched chain aliphatic radicals wherein R occurs twice as indicated and the symbol R represents like and unlike members of the group consisting of hydrogen and alkyl radicals containing 1 to 6 carbon atoms. Of these aliphatic radicals, there may be 1 to 10 as represented by the subscript $n$, for example —[C(R)$_2$]$_n$— includes such radicals as

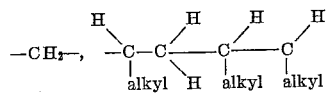

and

where alkyl may be any saturated aliphatic hydrocarbon radical containing 1 to 6 carbon atoms; R' is from the group consisting of hydrogen, alkyl with 1 to 6 carbon atoms, alkoxy with 1 to 6 carbon atoms, halogens, CN, carboxy and sulfonic acid; $m$ is 1 to 4; and —Y—NH$_2$ is the radical of an amino-substituted coupling component from the group consisting of certain arylamines of the benzene and naphthalene series, amino naphthol sulfonic acids, aminophenylamino-naphthol sulfonic acids, amino-benzoylamino-naphthol sulfonic acids, amino-benzoylamino-benzoyl-amino-napthol sulfonic acids and amino-phenyl pyrazolones.

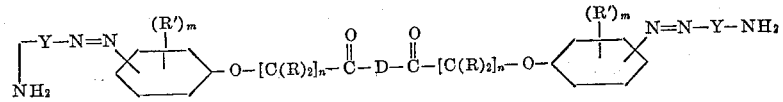

The invention will be more fully set forth in the following more detailed description which includes examples that are given as illustrative embodiments of the invention and not as limitations thereof. Parts are expressed in parts by weight unless otherwise noted.

appearance and substantivity for cotton and similar fibers. The product is represented by the formula

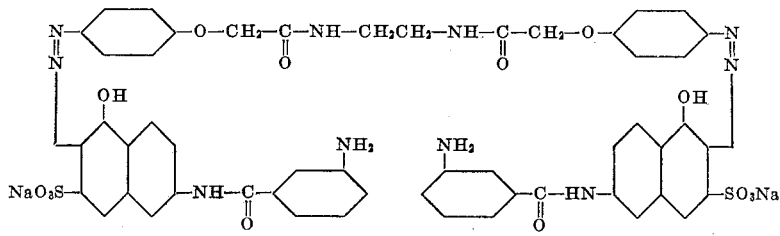

Example I

A slurry was made consisting of 143 parts of 1,2-di(4'-amino-phenoxy-acetylamino) ethane and 2000 parts of water. It was acidified by adding 73 parts of 100% hydrochloric acid as a 30% solution. The mixture was cooled by adding ice to 0° C. and 55 parts of 100% sodium nitrite were then added. Tetrazotization was continued at 0–5° C. for ½ hour whilst maintaining a slight excess nitrite.

A slurry containing 295 parts of 2(3'-aminobenzoylamino)-5-naphthol-7-sulfonic acid and 2000 parts of water was made. An aqueous solution of ammonia in sufficient quantity for complete solution and a slightly alkaline reaction to Brilliant Yellow paper was added and then 7 parts of sodium-bicarbonate were added. The solution was cooled to 0° C. and 170 parts of sodium-carbonate were added.

The solution of the tetrazo compound was slowly added to the cold alkaline solution of 2-(3'-amino-benzoyl-amino)-5-naphthol-7-sulfonic acid. The coupling mixture was stirred one hour after the tetrazo mixture had been added whilst an excess of the coupling component was present and alkalinity with sodium carbonate was maintained. The suspension was then heated to 70°–80° C., salted 5% with sodium chloride and filtered. The precipitate was dried at 80°–85° C. in an oven. The dry product had an orange Five parts of cotton piece goods were dyed from a water solution of the compound in the usual manner known to those skilled in the art, using two-tenths parts of the dye. The dyed fabric was rinsed in cold water and then put into 2000 parts of water at 20° C. The compound was tetrazotized on the fiber by adding three parts of sodium nitrite and four parts of sulfuric acid to the water and stirring for 15 minutes. The piece was rinsed with cold water and then put into a solution which was made by dissolving one part of beta-naphthol in 2000 parts of water and one-half part of caustic soda. The solution was stirred rapidly while adding the rinsed piece goods and stirring was continued for 15 minutes. The fabric was then rinsed in cold water and dried. The dyeing was a scarlet shade. The dye on the fiber is represented by the formula

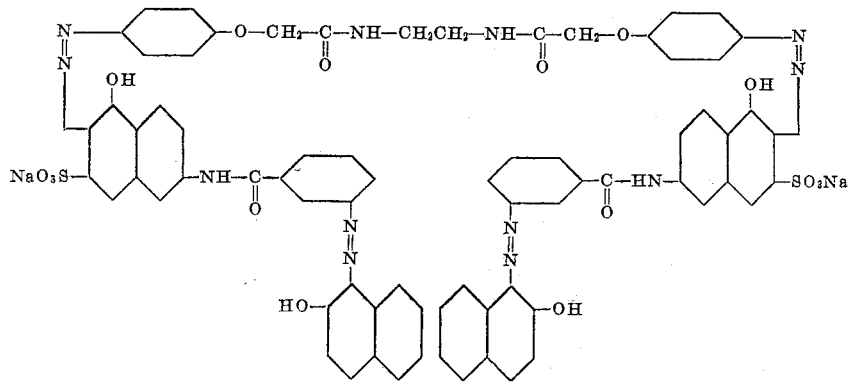

Example II

A dye represented by the formula 1,2-di-(4'-amino-phenoxy-acetylamino)-ethane ⇌ (1-(3'-aminophenyl)-5-pyrazolone-3-carboxylic acid)$_2$ was prepared by a procedure similar to Example I except that 180 parts of 1-(3'-amino-phenyl)-5-pyrazolone-3-carboxylic-acid were used instead of 295 parts of 2-(3'-amino-benzoyl-amino)-5-naphthol-7-sulfonic acid. The resulting dye was an orange powder, and had properties similar to the substantive compound of Example I. It is represented by the formula

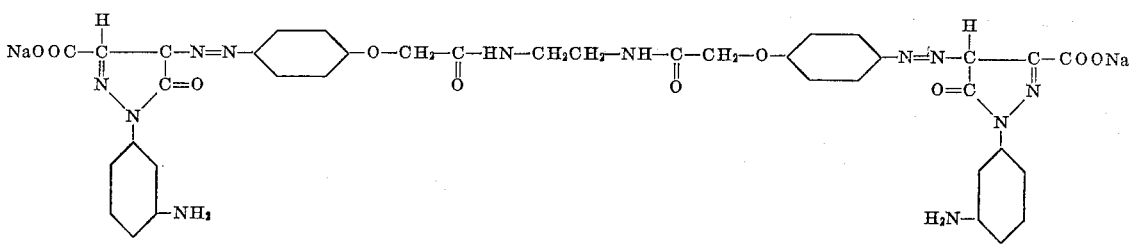

When dyed and developed on the fiber with beta naphthol in a manner similar to that described in Example I the dyeing was an orange shade. The structure of the dye on the fiber is represented by the formula

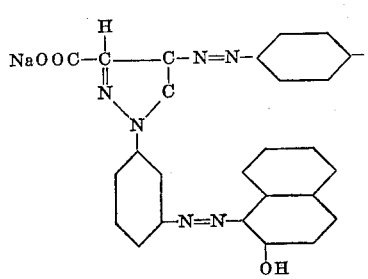

When dyed on cotton fiber and developed with beta naphthol in a manner similar to that de-

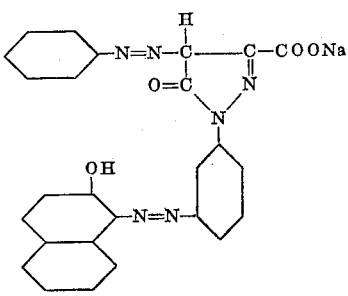

*Example III*

A dye represented by the formula 1,4-di(4'-amino-phenoxy-acetyl)-piperazine⇌[2(4'-amino-benzoylamino)-5-naphthol-7-sulfonic acid]₂ was made by following the procedure of Example I except that 153.5 parts of 1,4-di(4'-aminophenoxy-acetyl)-piperazine was used instead of 143 parts of 1,2-di(4'-aminophenoxy-acetylamino) ethane and 295 parts of 2-(4'-amino-benzoylamino)-5-naphthol-7-sulfonic acid was used instead of 295 parts of 2-(3'-amino-benzoylamino)-5-naphthol-7-sulfonic acid. The product in the form of a dry powder had an orange appearance and its other properties were similar to those of the product of Example I. The product is represented by the formula

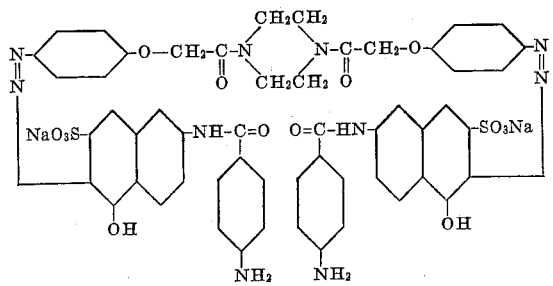

scribed in Example I the dyeing was a red shade. The dye on the fiber is represented by the formula

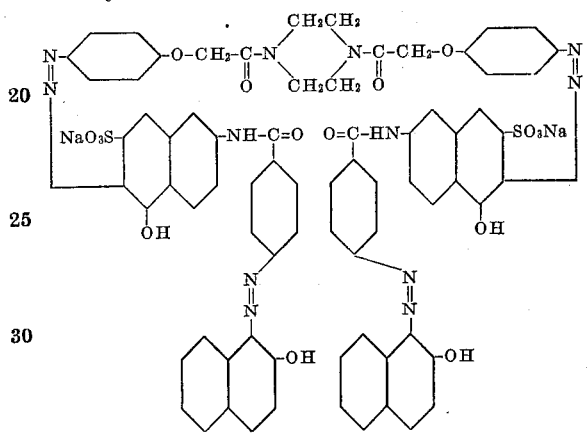

The following products were prepared by methods similar to those of the foregoing examples. The properties of these products were in general similar to the products of the foregoing examples except for variations in shade. The shades listed opposite each product are the shades of the dyeings on cotton when developed with the component indicated.

| Example | Combination | Developed with— | Shade |
|---|---|---|---|
| IV | 1,2-di(4'-aminophenoxy-acetylamino)-ethane ⇌ (2-amino-5-naphthol-7-sulfonic acid)₂ | Beta naphthol | Bordeaux. |
| V | 1,2-di(4'-aminophenoxy-acetylamino)-ethane ⇌ [2(4'-amino-3'-sulfo-phenylamino)-5-naphthol-7-sulfonic acid]₂ | ___do___ | Maroon. |
| VI | 1,2-di(4'-amino-2'-sulfo-phenoxy-acetylamino)-ethane ⇌ (2-amino-5-naphthol-7-sulfonic acid)₂ | ___do___ | Red. |
| VII | 1,2-di(4'-amino-2'-sulfo-phenoxy-acetylamino)-ethane ⇌ [2(3'-amino-benzoylamino)-5-naphthol-7-sulfonic-acid]₂ | ___do___ | Orange. |
| VIII | 1,2-di(4'-amino-2'-sulfo-phenoxy-acetylamino)-ethane ⇌ [2(4'-amino-benzoylamino)-5-naphthol-7-sulfonic acid]₂ | ___do___ | Do. |
| IX | 1,2-di(4'-amino-2'-sulfo-phenoxy-acetylamino)-ethane ⇌ [1(3'-aminophenyl)-5-pyrazolone-3-carboxylic acid]₂ | ___do___ | Yellow. |
| X | 1,2-di(4'-amino-2'-sulfo-phenoxy-acetylamino)-ethane ⇌ [2-(4'-amino-3'-sulfo-phenylamino)-5-naphthol-7-sulfonic acid]₂ | ___do___ | Maroon. |
| XI | 1,2-di(4'-amino-2'-sulfo-phenoxy-acetylamino)-ethane ⇌ (1-amino-naphthalene-6-sulfonic acid)₂ | ___do___ | Brown. |
| XII | 1,2-di(4'-amino-2'-methoxy-phenoxy-acetylamino)-ethane ⇌ [2-(3'-amino-benzoylamino)-5-naphthol-7-sulfonic acid]₂ | ___do___ | Scarlet. |
| XIII | 1,2-di(4'-amino-2'-methoxy-phenoxy-acetylamino)-ethane ⇌ (2-amino-5-naphthol-7-sulfonic acid)₂ | ___do___ | Maroon. |
| XIV | 1,2-di(3'-amino-2'-methyl-phenoxy-acetylamino)-ethane ⇌ [1-(3'-aminophenyl)-5-pyrazolone-3-carboxylic acid]₂ | ___do___ | Yellow. |
| XV | 1,2-di(3-amino-2'-methyl-phenoxy-acetylamino)-ethane ⇌ [2-(3'-amino-benzoylamino)-5-naphthol-7-sulfonic acid]₂ | ___do___ | Scarlet. |
| XVI | 1,2-di(3'-amino-2'-methyl-phenoxy-acetylamino)-ethane ⇌ (2-amino-5-naphthol-7-sulfonic acid)₂ | ___do___ | Maroon. |
| XVII | 1,2-di(3'-amino-2'-methyl-phenoxy-acetylamino)-ethane ⇌ (1-amino-5-naphthol-7-sulfonic acid)₂ | ___do___ | Do. |
| XVIII | 1,2-di(3'-amino-2'-methyl-phenoxy-acetylamino)-ethane ⇌ [2-(4'-amino-3'-sulfo-phenylamino)-5-naphthol-7-sulfonic acid]₂ | ___do___ | Rubine. |
| XIX | 1,2-di(3'-aminophenoxy-acetylamino)-ethane ⇌ [2-(3'-amino-benzoylamino)-5-naphthol-7-sulfonic acid]₂ | ___do___ | Orange. |
| XX | 1,2-di(3'-aminophenoxy-acetylamino)-ethane ⇌ (2-amino-5-naphthol-7-sulfonic acid)₂ | ___do___ | Maroon. |
| XXI | 1,2-di(4'-amino-2'-chloro-phenoxy-acetylamino)-ethane ⇌ [2-(3'-amino-benzoylamino)-5-naphthol-7-sulfonic acid]₂ | ___do___ | Scarlet. |
| XXII | 1,2-di(4'-amino-2'-chloro-phenoxy-acetylamino)-ethane ⇌ (2-amino-5-naphthol-7-sulfonic acid)₂ | ___do___ | Maroon. |
| XXIII | 1,2-di(4'-amino-2'-sulfo-phenoxy-acetylamino)-ethane ⇌ (1-amino-naphthalene)₂ | ___do___ | Brown. |

| Example | Combination | Developed with— | Shade |
|---|---|---|---|
| XXIV | 1,2-di(4'-amino-2'-sulfo-phenoxy-acetylamino)-ethane ⇌ (2-methoxy-5-methyl-aniline)₂. | Beta naphthol | Brown. |
| XXV | 1,2-di(4'-aminophenoxy-acetylamino)-ethane ⇌ [2-(4'(4''-amino-benzyol)-amino-benzoylamino)-5-naphthol-7-sulfonic acid]₂. | ___do___ | Scarlet. |
| XXVI | 1,2-di(4'-aminophenoxy-acetylamino)-ethane ⇌ (1-aminonaphthalene-6-sulfonic acid)₂. | ___do___ | Brown. |
| XXVII | 1,2-di(4'-aminophenoxy-acetylamino)-ethane ⇌ (1-amino-2-methoxy-naphthalene-6-sulfonic acid)₂. | ___do___ | Do. |
| XXVIII | 1,2-di(4'-aminophenoxy-acetylamino)-ethane ⇌ (1-amino-8-naphthol-3,6-disulfonic acid)₂. | ___do___ | Do. |
| XXIX | 1,6-di(4'-aminophenoxy-acetylamino)-hexane ⇌ [1-(3'-aminophenyl)-5-pyrazolone-3-carboxylic acid]₂. | ___do___ | Orange. |
| XXX | 1,6-di(4'-aminophenoxy-acetylamino)-hexane ⇌ [2-(3'-amino-benzoyl-amino)-5-naphthol-7-sulfonic acid]₂. | ___do___ | Scarlet. |
| XXXI | 1,6-di(4'-aminophenoxy-acetylamino)-hexane ⇌ (2-amino-5-naphthol-7-sulfonic acid)₂. | ___do___ | Maroon. |
| XXXII | 1,6-di(4'-aminophenoxy-acetylamino)-hexane ⇌ (1-amino-5-naphthol-7-sulfonic acid)₂. | ___do___ | Do. |
| XXXIII | 1,6-di(4'-aminophenoxy-acetylamino)-hexane ⇌ [2-(4'-amino-3'-sulfo-phenyl-amino)-5-naphthol-7-sulfonic acid]₂. | ___do___ | Rubine. |
| XXXIV | 1,2-di(4'-aminophenoxy-acetylamino)-ethane ⇌ [2(3'-amino-benzoyl-amino-5-naphthol-7-sulfonic acid]₂. | ___do___ | Scarlet. |
| XXXV | 1,4-di(4'-aminophenoxy-acetyl)-piperazine ⇌ [2-(4'-amino-3'-sulfo-phenylamino)-5-naphthol-7-sulfonic acid]₂. | ___do___ | Blue. |
| XXXVI | 1,4-di(4'-aminophenoxy-acetyl)-piperazine ⇌ (1-amino-5-naphthol-7-sulfonic acid)₂. | ___do___ | Bordeaux. |
| XXXVII | 1,4-di(4'-aminophenoxy-acetyl)-piperazine ⇌ (2-amino-5-naphthol-7-sulfonic acid)₂. | ___do___ | Blue. |
| XXXVIII | 1,4-di(4'-aminophenoxy-acetyl)-piperazine ⇌ [1-(3'-aminophenyl)-5-pyrazolene-3-carboxylic acid]₂. | ___do___ | Orange. |
| XXXIX | 1,4-di(4'-aminophenoxy-acetyl)-piperazine ⇌ (2-amino-5-naphthol-1-sulfonic acid)₂. | ___do___ | Blue. |
| XL | 1,4-di(4'-aminophenoxy-acetylamino)-cyclohexane ⇌ [1-(3'-aminophenyl)-5-pyrazolene-3-carboxylic acid]₂. | ___do___ | Orange. |
| XLI | 1,4-di(4'-aminophenoxy-acetylamino)-cyclohexane ⇌ [2(3'-amino-benzoylamino)-5-naphthol-7-sulfonic acid]₂. | ___do___ | Scarlet. |
| XLII | 1,2-di(4'-aminophenoxy-acetylamino)-ethane ⇌ [1-(3'-aminophenyl)-5-pyrazolone-3-carboxylic acid]₂. | Phenyl-methyl-pyrazolone. | Yellow. |
| XLIII | ___do___ | Meta-toluylene-diamine. | Orange. |
| XLIV | ___do___ | Aceto-acetanilide. | Yellow. |
| XLV | 1,2-di(4'-aminophenoxy-acetylamino)-ethane ⇌ (2-amino-5-naphthol-7-sulfonic acid)₂. | Phenyl-methyl-pyrazolone. | Red. |
| XLVI | ___do___ | Meta-toluylene-diamine. | Violet. |
| XLVII | ___do___ | Aceto-acetanilide. | Red brown. |
| XLVIII | 1,2-di(4'-aminophenoxy-acetylamino)-ethane ⇌ [2-(4'-amino-benzoylamino)-5-naphthol-7-sulfonic acid]₂. | Phenyl-methyl-pyrazolone. | Scarlet. |
| XLIX | ___do___ | Meta-toluylene-diamine. | Red. |
| L | ___do___ | Aceto-acetanilide. | Scarlet. |

Many other compounds can be used for the first components to make products having properties similar to the foregoing products which are represented by the general formula heretofore given. As representative of such first components, the following are mentioned:

1,2-di-(4'-aminophenoxy-acetlyamino)-ethane,
1,6-di-(3'-aminophenoxy-acetylamino)-hexane,
1,2-di(4'-amino-2'-chloro-phenoxy-acetylamino)-ethane,
1,2-di[alpha-(4'-amino-2'-methoxy-phenoxy)-propionylamino]-propane,
1,3-di[alpha(3'-amino-phenoxy)-butyrylamino]-butane,
1,4-di(4'-aminophenoxy-acetyl)-piperazine,
1,2-di(3'-aminophenoxy-acetyl)-3,5-dimethyl-pyrazolidine,
1,4-di(4'-aminophenoxy-acetyl)-ethylene-trimethylene-diamine,
1,5-di(3'-aminophenoxy-acetyl)-bis-trimethylene-diamine,
1,4-di(4'-amino-phenoxy-acetylamino)-butane,
1,10-di[alpha-(4'-amino-phenoxy-propionylamino)]-decane,
1,3-di[alpha(3'-amino-phenoxy-heptanoylamino)]-propane,
1,3-di[beta(3'-amino-phenoxy-butyrylamino)]-heptane,
1,2-di(4'-amino-2'-sulfo-phenoxy-acetylamino)-ethane,
1,2-di(4'-amino-phenoxy-acetylamino)-1,2-dimethyl-ethane,
1,2-di[beta-(4'-amino-phenoxy-propionylamino)]-ethane,
1,2-di(2'-methyl-5'-amino-phenoxy-acetylamino)-ethane,
1,4-di[alpha-ethyl-beta(3'-amino-phenoxy)-propionylamino]-4-methyl-3-ethyl-pentane,
1,4-di(4'-amino-phenoxy-acetylamino)-cyclobutane,
1,4-di(4'-amino-phenoxy-acetylamino)-2,5-dimethyl-cyclohexane,
1,4-di-(4'-amino-phenoxy-acetyl)-2-methyl-piperazine and
1,4-di-(4'-amino-phenoxy-acetyl)-2,5-dimethyl-piperazine.

As the Y—NH₂ or coupling components indicated in the general formula the following are the classes (1) Arylamines of the benzene and naphthalene series represented by the formulas

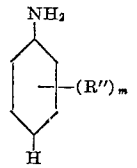

and

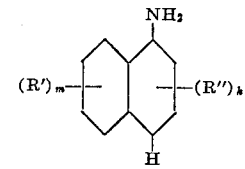

wherein R' and m have the values heretofore defined, R'' is from the group consisting of hydrogen, alkyl, and alkoxy, $k$ is 1 to 2 and the symbol —H denotes the coupling position.

(2) Amino naphthol sulfonic acids represented by the formula

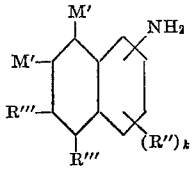

in which one R''' is hydrogen and the other is hydroxy and the M' which is meta to hydroxy is —SO₃H and the other is hydrogen.

(3) Amino-phenyl - amino - naphthol sulfonic acids represented by the formula

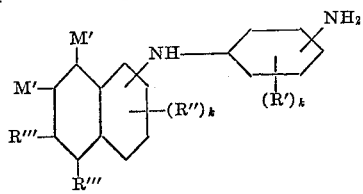

(4) Amino - benzoylamino - naphthol sulfonic acids and amino - benzoylamino - benzoylamino- naphthol sulfonic acids represented by the formulae

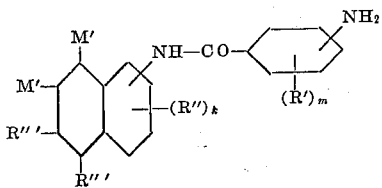

and

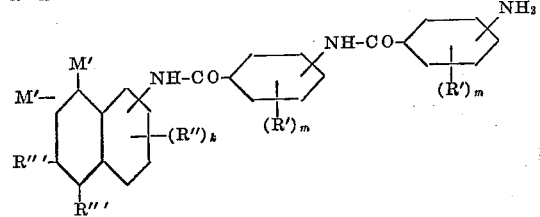

(5) Amino phenyl pyrazolones represented by the formula

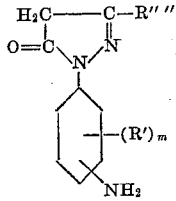

in which R'''' is one of a group consisting of alkyl and carboxyl.

As illustrative of the many second components which can be used to produce the dyes having the characteristic structure and properties of those specifically described, the following are mentioned: 3-amino-anisole, 1-naphthylamine-6-sulfonic acid, 2-amino-5-naphthol-7-sulfonic acid, 2-(4'-amino-3'-sulfo-phenylamino)-5-naphthol - 7-sulfonic acid, 2-(4'-amino-benzoylamino)-5-naphthol-7-sulfonic acid, 1 - (3' - aminophenyl)- 5-pyrazolone-3-carboxylic acid, aniline, 3-amino-toluene, 2,5-dimethoxy-aniline, 2-methoxy-aniline, 2-methoxy-5 - methyl - aniline, 2 - amino-naphthalene, 1-amino-2-methoxy-napthhalene-6-sulphonic acid, 1-amino-naphthalene - 6 - carboxylic acid, 1,8-amino-naphthol-3,6-disulfonic acid, 2-amino-8-naphthol-3,6-disulfonic acid, 1- amino-8-naphthol-3,5-disulfonic acid, 1-amino-8-naphthol-4-sulfonic acid, 1-amino-5-naphthol-7-sulfonic acid, 2-amino-8-naphthol-6-sulfonic acid, 1-amino-5-naphthol, 2-(3'-amino-benzoyl-amino)-5-naphthol-7-sulfonic acid, 1-(4'-amino-benzoylamino)-5-naphthol-7-sulfonic acid, 2[4'-(4''-amino - benzoylamino) - benzoylamino] - 5-naphthol-7-sulfonic acid, 1-(4'-amino-benzoyl-amino)-8-naphthol-4-sulfonic acid, 1-(4'-amino-phenyl)-5-pyrazolone-3-carboxylic acid, 1-(3'-aminophenyl)-3-methyl-5-pyrazolone, 1-(4'-amino-phenyl)-3-methyl-5-pyrazolone, 1 - (2' - methoxy-5'-amino-phenyl)-3-methyl-5-pyrazolone, 1-(4'-amino-3'-carboxy-phenyl) - 3 - methyl - 5-pyrazolone, 1-(4'-amino-3'-sulfo-phenyl)-5- pyrazolone-3-carboxylic acid, 1-(2'-methyl-5'-amino-phenyl) - 3 - methyl - 5 - pyrazolone, 1 - (2'-methyl-5'-amino-phenyl)-5-pyrazolone - 3 - carboxylic acid and 1-(2'-chloro-5'-amino-phenyl)- 5-pyrazolone-3-carboxylic acid.

The substantive dyes contain at least two solubilizing groups such as carboxyl and sulfonic acid but more can be present.

As developing components 1-phenyl-3-methyl-5-pyrazolone, meta-toluylene diamine or acet-oacet anilide can be used as well as beta naphthol. These coupling components produce developed dyeings having similar superior fastness discharge and brightness properties as those produced by developing with beta naphthol and variations in shade can be attained by selection of the coupling component.

The first components of the azo compounds can be made by condensing a diamino alkane, a diamino-cyclo-alkane or a diaza-cyclo-alkane of the kinds described, such as a compound represented generally by the formula NH₂—D—NH₂ with a nitro acyl halide of the type

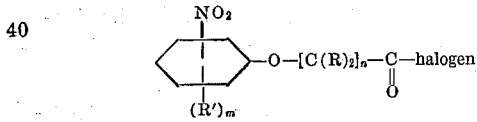

and then reducing the nitro groups of the di-(nitro phenoxy acylamino)-alkane, -cyclo-alkane or -diaza-cyclo-alkane to amino. In general the condensation can be carried out readily at about 10° to 20° C. in the presence of a basic condensing agent such as an alkali metal hydroxide and in a medium comprising a non-reactive organic solvent, such as ethylene dichloride. The primary diamines formed after reduction of the nitro groups can then be separated and the products can be tetrazotized by methods which are in general well known in the art.

The tetrazotizable products are substantive to cotton, regenerated cellulose, various vegetable fibers and similar dyeable substances. When they are tetrazotized and developed on the fiber with the described azo dye coupling component they have excellent fastness to washing, they do not appreciably stain associated undyed fibers during washing and they have good general properties which are desirable in dyed fibers. When developed on the fibers the brightness of the dyeing is superior as compared with dyeings of like shade which are made with quite similar dyes which do not contain the phenoxy group. For example a dyeing on cotton made with 1,2-di(4'-amino-phenoxy-acetylamino)-ethane and developed with beta naphthol is brighter than one made on cotton with 1,2-di(4'-aminobenzoyl-amino)-ethane and developed with beta naphthol.

From the foregoing disclosure it will be recognized that the invention is susceptible of modification without departing from the spirit and scope thereof and it is to be inderstood that the invention is not restricted to the specific illustrations thereof herein set forth.

I claim:

1. An azo compound represented by the formula

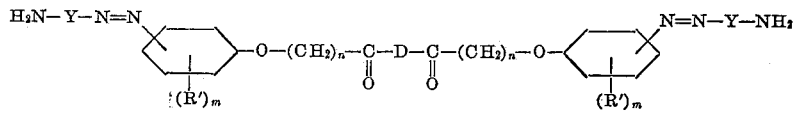

in which D represents a radical of the group consisting of the polymethylene diamines having 2 to 10 methylene groups and the straight and branched chain alkyl derivatives thereof in which alkyl has 1 to 6 carbons and in which the methylene groups are substituted once to twice the number of methylene groups, a radical of the diamino-cyclo-alkane series having 4 to 6 carbons in the ring and the mono- and di-methyl derivatives thereof, and a radical of the diaza-cyclo-alkane series having 3 to 6 carbons in the ring and the mono- and di-methyl derivatives thereof; $n$ is 1 to 6; each R' is from the group consisting of hydrogen, alkyl having 1 to 6 carbons, the corresponding alkoxy groups, halogen, CN, carboxy and sulfonic acid; $m$ is 1 to 4; and each Y—$NH_2$ is the radical of a coupling component from the group consisting of arylamines of the benzene and naphthalene series, amino naphthol sulfonic acids, amino-phenyl-amino-naphthol sulfonic acids, amino-benzoylamino-naphthol sulfonic acids, amino-benzoylamino-benzoyl-amino-naphthol sulfonic acids and amino-phenyl pyrazolones.

2. An azo compound represented by the formula

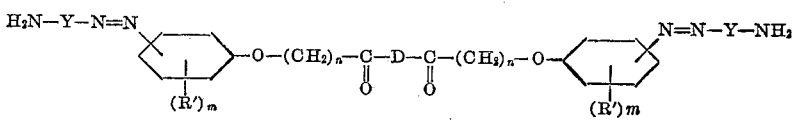

in which D represents a radical of the group consisting of the polymethylene diamines having 2 to 10 methylene groups and the straight and branched chain alkyl derivatives thereof in which alkyl has 1 to 6 carbons and in which the methylene groups are substituted once to twice the number of methylene groups, a radical of the diamino-cyclo-alkane series having 4 to 6 carbons in the ring and the mono- and di-methyl derivatives thereof, and a radical of the diaza-cyclo-alkane series having 3 to 6 carbons in the ring and the mono- and di-methyl derivatives thereof; $n$ is 1 to 6; each R' is from the group consisting of hydrogen, alkyl having 1 to 6 carbons, the corresponding alkoxy groups, halogen, CN, carboxy and sulfonic acid; $m$ is 1 to 4; and each Y—$NH_2$ is the radical of a coupling component of the benzene and naphthalene series from the group which is represented by the following formulae,

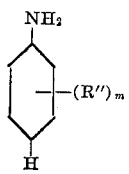

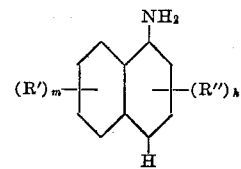

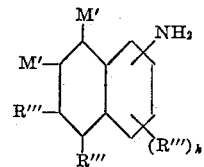

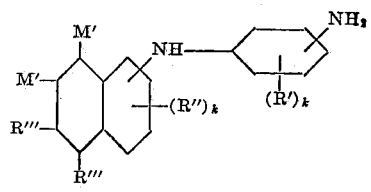

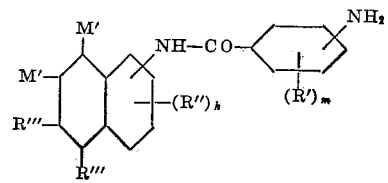

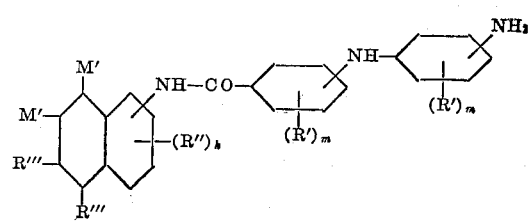

and

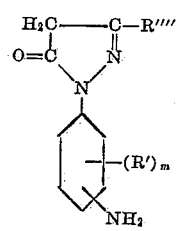

wherein R'' is one or any combination of the group consisting of hydrogen, alkyl having 1 to 6 carbons, and the corresponding alkoxy groups; $k$ is 1 to 2; the symbol —H denotes the coupling position; one R''' is hydrogen and the other is hydroxy; the M which is meta to hydroxy is —$SO_3H$ and the other is hydrogen; and R'''' is one of a group consisting of alkyl having 1 to 6 carbons and carboxyl; said compound having at least two solubilizing groups.
3. The azo compound represented by the formula
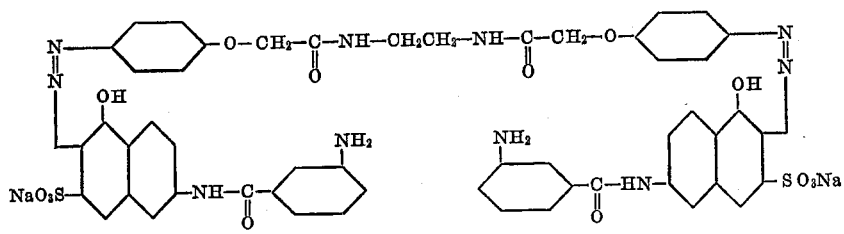
4. The azo compound represented by the formula
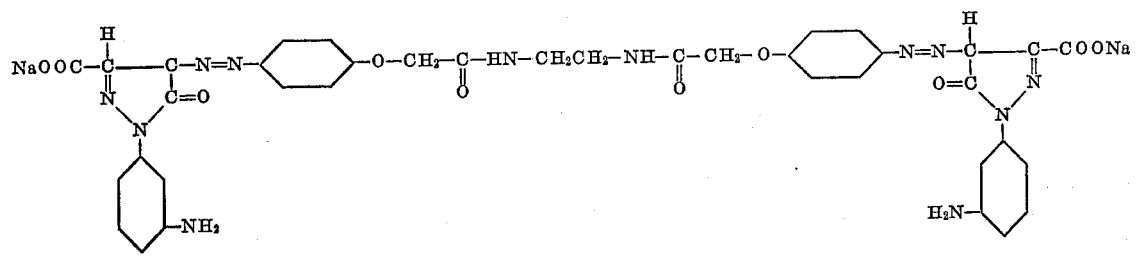
5. The azo compound represented by the formula
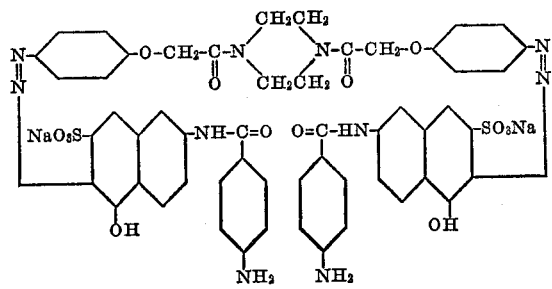
CHILES E. SPARKS.

CERTIFICATE OF CORRECTION.

Patent No. 2,286,391.　　　　　　　　　　　　　　　June 16, 1942.

CHILES E. SPARKS.

It is hereby certified that error appears in the printed specification of the above numbered patent requiring correction as follows: Page 3, second column, line 42, before the word "component" insert --coupling--; and that the said Letters Patent should be read with this correction therein that the same may conform to the record of the case in the Patent Office.

Signed and sealed this 4th day of August, A. D. 1942.

(Seal)

Henry Van Arsdale,
Acting Commissioner of Patents.